United States Patent [19]

Yamashita

[11] Patent Number: 5,341,376
[45] Date of Patent: Aug. 23, 1994

[54] ATM CELL FORMAT CONVERSION SYSTEM

[75] Inventor: Hiroshi Yamashita, Tokyo, Japan

[73] Assignee: NEC Corporation, Japan

[21] Appl. No.: 736,728

[22] Filed: Jul. 26, 1991

[30] Foreign Application Priority Data

Jul. 27, 1990 [JP] Japan ................................. 2-197627

[51] Int. Cl.$^5$ ............................................. H04J 3/00
[52] U.S. Cl. ..................................... 370/99; 370/94.1; 370/94.2
[58] Field of Search ....................... 370/94.2, 60, 94.1, 370/102, 99

[56] References Cited

U.S. PATENT DOCUMENTS

| 5,030,951 | 7/1991 | Eda et al. ........................ 370/102 X |
| 5,103,447 | 4/1992 | Takiyasu et al. ................. 370/94.1 X |

FOREIGN PATENT DOCUMENTS

| 0351818 | 1/1990 | European Pat. Off. ..... H04L 12/56 |
| 0386483 | 9/1990 | European Pat. Off. ........ H04J 3/00 |
| 0436069 | 7/1991 | European Pat. Off. ..... H04L 12/56 |

OTHER PUBLICATIONS

A. Thomas, J. P. Coudreuse and M. Servel, "Asynchronous Time–Division Techniques": An Experimental Packet Network Integrating Videocommunication :, ISS '84 (May 1984).
H. Suzuki, H. Nagano, T. Suzuki, T. Takeuchi and S. Iwasaki, "Output–buffer Switch Architecture for Asynchronous Transfer Mode:", ICC '89 (Jun. 1989).
CCITT "Study Group XVIII—Report R-33 (COM XVIII-R 33-E" published in Jun. 1990.
IEEE Communications Magazine, vol. 29, No. 3; Mar. 1989; US pp. 8–15; Ballart et al., "Sonet: Now It's the Standard Optical Network".
Philips Telecommunications and Data Systems Review. vol. 48, No. 2, Jun. 1990, Hilversum NL pp. 15–22; W. Kricj "ATM-A Transfer Concept Not Only for Broadband Services".

Primary Examiner—Douglas W. Olms
Assistant Examiner—Russell Blum
Attorney, Agent, or Firm—Ostrolenk, Faber, Gerb & Soffen

[57] ABSTRACT

An ATM (Asynchronous Transfer Mode) cell format conversion system writes in a memory a plurality of ATM cells each being 53 octets long and mapped in the payload fields of virtual containers VC-4-NC which have been multiplexed in the form of STM-N frames and have been extracted from said frames. A 1 octet-long cell overhead is added to each of the ATM cells read out of the memory in response to base frame pulses which are synchronous with the STM-N frames, whereby the ATM cells are converted to 1-octet-added ATM cells each being 54 octets long. The 1-octet-added ATM cells and an idle cell are mapped in an imaginary matrix 5 column groups×9 rows frame by frame and then outputted. This allows each of the STM-N frames or be switched to otherwise processed on an ATM cell basis.

6 Claims, 5 Drawing Sheets

FIG. 5

ATM CELL FORMAT CONVERSION SYSTEM

BACKGROUND OF THE INVENTION

1. Field of the Invention

The present invention relates to a system for processing ATM (Asynchronous Transfer Mode) cells and, more particularly, to a method and an apparatus for converting the ATM cell format such that a plurality of ATM cell streams multiplexed in the payload fields of virtual containers "VC-4-NC" in the form of an "STM-N" frame structure based on CCITT Recommendations G.708 and G.709, which will be described, can be processed frame by frame or cell by cell.

2. Description of the Prior Art

An ATM transmission system using packets each having a fixed length and including a destination indication, i.e., ATM cells, is a promising digitized speech, data and picture information transmission and switching technology for future broad band ISDN (Integrated Services Digital Network). In the ATM transmission system each of, the ATM cells to be transmitted has a fixed length of 53 octets and can therefore be switched by hardware, promoting high-speed information transmission. For details of switching suitable for ATM cells, reference may be made to A. Thomas, J. P. Coudreuse and M. Servel, "Asynchronous Time-Division Techniques: An Experimental Packet Network Integrating Videocommunication", ISS '84 (May 1984), and H. Suzuki H. Hagano, T. Suzuki, T. Takeuchi and S. Iwasaki, "Output-buffer Switch Architecture for Asynchronous Transfer Mode", ICC '89 (June 1989).

On the other hand, to implement an ATM transmission network, it is desired to use existing facilities developed for a conventional STM (Synchronous Transfer Mode) transmission system. In light of this, CCITT Study Group XVIII studied the specifications of a transmission information structure compatible with the SDH (Synchronous Digital Hierarchy) which is capable of transmitting information with an 8 kHz base clock (i.e., a period of 125 µs) particular to conventional apparatuses. The result of those studies was reported in June, 1990. For details of the specifications, see "Revised draft Recommendations G. 707, G.708 and G.709" in CCITT "STUDY GROUP XVIII-REPORT R-33 (COM XVIII-R 33-E) published in June 1990".

To transmit ATM cells according to, for example, the information structure of VC (Virtual Container)-4 or STM-4 compatible with SDH as prescribed by the above CCITT Recommendation, a plurality of ATM cells each being 53 octets long (more particularly including a header having five octets and an information field having 48 octets) are arranged or mapped in the payload field of VC-4-NC (N Concatenation) which has been multiplexed in the form of the "STM-N" frame construction (see the above CCITT Report, page 23, item 3, page 45, item 3.1.7, and page 58, item 5.8; "VC-4-NC" is denoted by "VC-4-ZXc" or "VC-x-mc" in this Report).

Some of such ATM cells are divided by SDH overhead fields, i.e., a section overhead (SOH) field of frame structure "STM-N" and a path overhead (POH) field of virtual container VC-4-NC, resulting in an ATM cell stream which is not continuous with respect to time. Also, since integral multiples of the 53-octet length of one ATM cell are not coincident with the information capacity of the payload field (260×9×N octets), the last ATM cell of one STM-N frame is mapped not only in the STM-N frame of interest but also in the subsequent STM-N frame and, therefore is, not continuous with respect to time. When such a plurality of ATM cells are to be switched or multiplexed on a cell basis by an ATM switch, ATM multiplexing apparatus, or similar ATM cell processing apparatus, processing them in synchronism with the frames compatible with SDH is not practicable due to the presence of the ATM cells which are not continuous with respect to time.

To convert an ATM cell stream which is discontinuous with respect to time as stated above, it has been customary to remove the section overheads (SOHs) and path overheads (POHs) from an input signal, write only the ATM cells into a buffer memory according to a write clock corresponding to the bit length and bit rate of the cells, and read them out of the buffer memory according to a read clock whose bit rate is equal to the mean bit rate of the write clock. In this manner, an ATM cell stream free from discontinuity appears at the output of the buffer memory due to the difference in bit rate between the write clock and the read clock.

Although the above-stated conventional approach is successful in removing the discontinuity of an ATM cell due to the overhead fields of one STM-N frame, it cannot cope with the discontinuity ascribable to an ATM cell extending over two successive STM-N frames. Specifically, the total information capacity of an STM-N frame is 270×9×N octets and does not coincide with integral multiples (53×n octets) of 53 octets, which is the length of ATM cells, as stated earlier. Hence, even though the use of a buffer memory using a write clock and a read clock different in bit rate from each other may be able to prevent an ATM cell from extending over two STM-N frames, the above approach would eventually fail to satisfy the condition of providing the correct SDH frame period (125 µs).

Under the above circumstances, there is a demand for ATM cell format converting means capable of converting a plurality of ATM cells contained in a virtual container VC-4-NC having the "STM-N" frame construction to an ATM cell stream divided on a frame basis and, moreover, capable of maintaining synchronism with the 8 kHz base clock (period 125 µs) of a conventional apparatus.

BRIEF SUMMARY OF THE INVENTION

Object of the Invention

It is therefore an object of the present invention to provide a method and an apparatus for ATM cell format conversion which can convert an ATM cell stream having a plurality of ATM cells each being 53 octets long and mapped in the payload fields of virtual containers VC-4-NC which are multiplexed in an "STM-N" frame construction, into an ATM cell stream having such a format that the cell stream can be processed on an STM-N frame basis and, moreover, on a cell basis.

It is another object of the present invention to provide an ATM cell processing system capable of readily processing an ATM cell stream having a plurality of ATM cells each being 53 octets long and mapped in the payload fields of virtual containers VC-4-NC multiplexed in the form of the "STM-N" frame construction, on an STM-N frame basis and, moreover, on a cell basis.

SUMMARY OF THE INVENTION

An ATM cell format converting method of the present invention comprises the steps of removing section overhead (SOH) information and path overhead (POH) information from a digital signal multiplexed in the form of STM-N frames, adding 1 octet long cell overhead information to each of a plurality of ATM cells each being 53 octets long and included in the payload fields of virtual containers VC-4-NC to convert them ATM cells each being 54 octets long, adding a 54 octets long idle cell to each of the 54 octets long ATM cells, and mapping the ATM cells and idle cell in the entire range of STM-N frames, thereby outputting an ATM cell stream having a plurality of continuous ATM cells.

An ATM cell format converting apparatus of the present invention comprises means for generating a payload field indication signal representative of a payload field of each of the STM-N frames; cell overhead information generating means for generating 1 octet long cell overhead information; ATM cell rearranging means for adding, in response to the payload field indication signal, the cell overhead information to each of a plurality of ATM cells each being 53 octets long and contained in the payload fields of the STM-N frame virtual containers VC-4-NC, to thereby convert the STM-N frames to 54 octets long ATM cells, and for rearranging the 54 octets long ATM cells in the entire range of the STM-N frames,; and idle cell inserting means for generating, when the ATM cells at the input side and the output side of the ATM cell rearranging means have a phase difference which is smaller than a predetermined value, a 54 octets long idle cell and inserting it in the output of the ATM cell rearranging means.

In the method of the present invention, a 54 octets long control information cell may be generated every predetermined number of STM-N frames and rearranged in the entire range of the STM-N frames together with the 54 octets long ATM cells, thereby outputting the ATM cell stream.

In the apparatus of the present invention, control information cell inserting means may be interposed between the ATM cell rearranging means and the idle cell inserting means for generating a 54 octets long information cell every predetermined number of STM-N frames and inserting it in the output of the ATM cell rearranging means.

The ATM cell stream made up of a plurality of ATM cells is applied to an ATM switch which processes it on an ATM cell basis in synchronism with frames corresponding to STM-N frames.

In accordance with the present invention, the ATM cell stream made up of a plurality of ATM cells, each being 53 octets long and mapped in the payload fields of virtual containers VC-4-NC which are multiplexed in the form of STM-N frames, is continuous with respect to time on a cell basis and on an STM-N frame basis. This, coupled with the fact that cell overhead information including control and monitor information between apparatuses is added on a cell basis, insures the speed and quality of self-routing or similar operation of the ATM switch which uses an 8 kHz base clock.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENT

Figure 1:
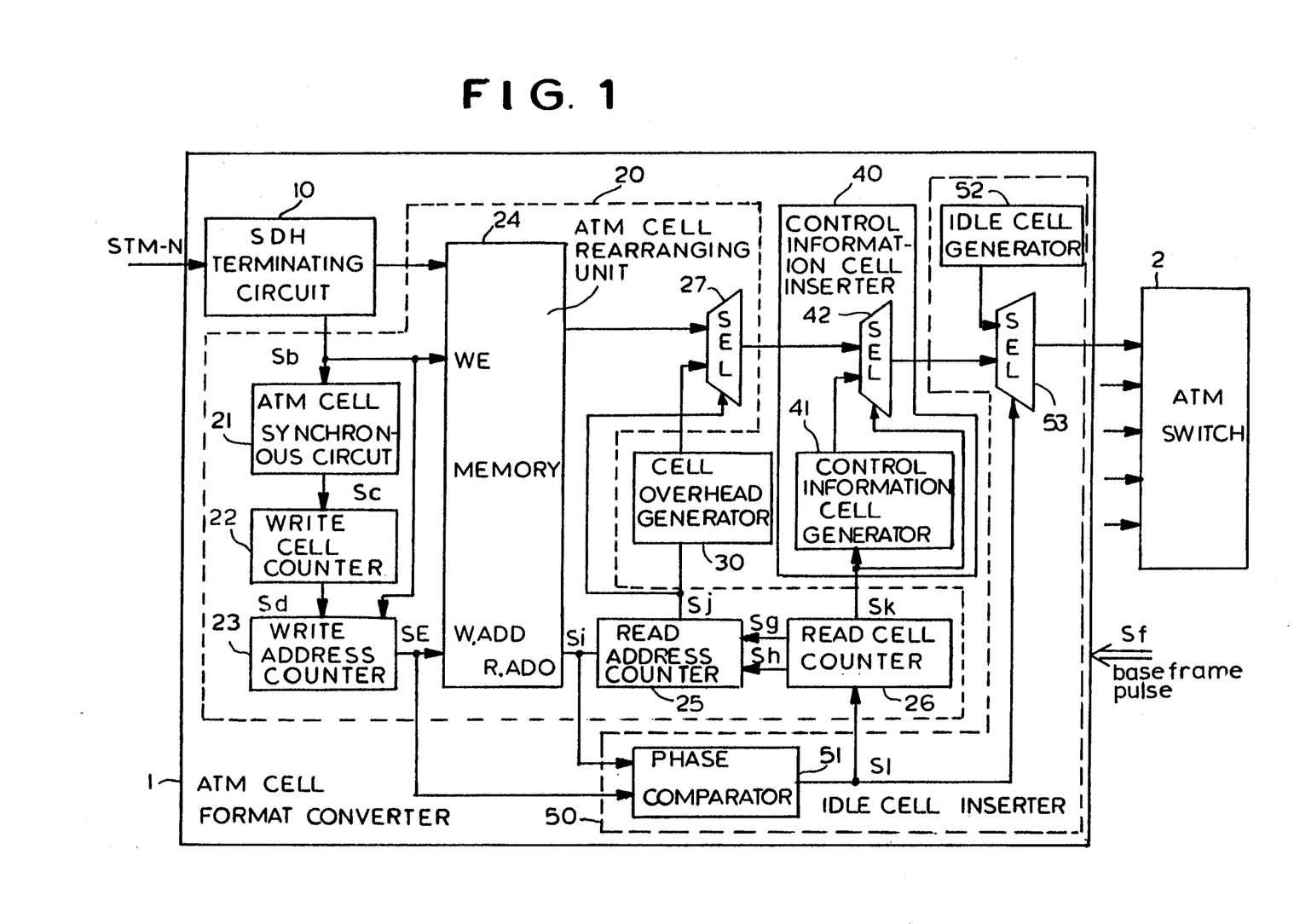
FIG. 1 is a block diagram schematically showing an ATM cell format converting apparatus embodying the present invention.

Referring to FIG. 1 of the drawings, an ATM cell format conversion system embodying the present invention is shown and generally designated by the reference numeral 1. As shown, the system 1 has an SDH terminating circuit 10, a cell overhead generator 30, an ATM cell rearranging unit 20, an idle cell inserter 50, and a control information cell inserter 40. The output of the system 1 is fed to a conventional ATM switch 2. Applied to the system 1 are base frame pulses Sf and various kinds of timing signals.

A digital signal fed to the SDH terminating circuit 10 has been produced by multiplexing, in the STM-N frame from virtual containers containing an ATM cell stream in the payload field thereof. The SDH terminating circuit 10 produces a payload field indication signal Sb indicative of the payload fields of STM-N frames, as distinguished from overhead (SOH) fields of STM-N frames and overhead fields (POH) of VC-4-NC.

The cell overhead generator 30 generates 1 octet cell overhead information for controlling and monitoring the ATM cells on a cell basis.

The ATM cell rearranging unit 20 adds, in response to the output of the SDH terminating circuit 10, the cell overhead information from the cell overhead generator 30 to each of the ATM cells contained in the payload field of the STM-N frame to thereby convert the ATM cell into an ATM cell which is 54 octets long. The resulting 54-octet-long ATM cells are rearranged in synchronism with the STM-N frames and outputted from the rearranging unit 20 as a continuous ATM cell stream. The ATM cell rearranging unit 20 has an ATM cell synchronous circuit 21, a write cell counter 22, a write address counter 23, a memory 24, a read address counter 25, a read cell counter 26, and a selector (SEL) 27. The ATM cell synchronous circuit 21 detects, in response to the payload field indication signal Sb from the SDH terminating circuit 10, the boundary between nearby ATM cells continuously mapped in the payload field on the basis of the synchronous pattern which each ATM cell has, thereby producing ATM cell boundary signal Sc. Implemented as a shift register or a ring counter, for example, the write cell counter 22 is clocked by the ATM cell boundary signal Sc from the ATM cell synchronous circuit 21 and generates a write reset signal Sd every time it counts the signal Sc a predetermined number of times (n times). The write address counter 23 is initialized by the write reset signal Sd and sequentially generates write address signals Se meant for the memory 24 by using the payload field indication signal Sb as a count enable signal. The memory 24 receives the payload field indication signal Sb as a write enable signal to sequentially store a predetermined number (n) of ATM cells (53 octets long) in response to the write address signals Se from the write address counter 23. In response to read address signals Si from the read address counter 25, the memory 24 sequentially outputs the ATM cells having been stored therein.

The read cell counter 26, like the write cell counter 22, is constituted by a shift register or a ring counter, for example, and generates, on the basis of base frame pulses Sf having the same period as the STM-N frames (125 μs/frame), a read reset signal Sg every time a period of time corresponding to the predetermined number (n) of 54 octets long ATM cells expires. Further, by counting the base frame pulses Sf, the read cell counter 26 outputs a cyclic cell insertion signal Sk whose duration corresponds to one ATM cell (54 octets), every predetermined number of frames (e.g. every two frames). When the read cell counter 26 has outputted the cyclic cell insertion signal Sk or when it has received an idle cell insertion signal Sl from the idle cell inserter 50, the read cell counter 26 outputs a count disable signal Sh whose duration corresponds to one ATM cell (54 octets) and, at the same time, delays the output of the next read reset signal Sg by the duration of the count disable signal Sh. The read address counter 25 is initialized by the read reset signal Sg and sequentially generates the read address signals Si meant for the memory 24 by using the count disable signals Sh. While so generating the read address signals Si, the read address counter 25 stops operating for the duration of one octet and, at the same time, outputs an overhead addition signal Sj every time it counts 53 octets. The counter 25 repeats such an operation a predetermined number of times (n times). In response to each overhead addition signal Sj, the selector 27 adds the 1-octet cell overhead information from the cell overhead generator 30 to each 53 octets long ATM cell read out of the memory 24, thereby sending out 54 octets long ATM cells.

The control information cell inserter 40 is made up of a control information cell generator 41 and a selector 42. The control information cell generator 41 generates a 54 octets control information cell including control information (e.g. path monitor information) on an input channel basis. The selector 42 selects, in response to the cyclic cell insertion signal Sk from the ATM cell rearranging unit 20, either the ATM cell outputted by the rearranging unit 20 or the control information cell.

The idle cell inserter 50 has a phase comparator 51, an idle cell generator 52, and a selector 53. The phase comparator 51 compares the phase of the write address signal Se and that of the read address signal Si. If the difference between the two phases is smaller than a predetermined difference (the number of octets over which the ATM cells of the payload field of the STM-N frame are discontinuous), the phase comparator 51 generates an idle cell insertion signal Se whose duration corresponds to 54 octets. On the other hand, the idle cell generator 52 generates an idle cell which is 54 octets long and delivers it to the selector 53. In response to the idle cell insertion signal Se, the selector 53 selects either the ATM cell from the control information cell inserter 40 or the idle cell from the idle cell generator 52.

The ATM switch 2 switches the converted ATM cell stream having a frame format from the conversion system 1 on an ATM cell basis while synchronizing the cell stream to the STM-N frame. Details of the ATM switch 2 will not be described herein since it may be implemented with a conventional scheme such as that taught by H. Suzuki et al. in "Output-buffer Switch Architecture by Asynchronous Transfer Mode", ICC '89 (June 1989), as previously referred to.

The operation of the ATM cell format conversion system 1 will be described with reference also being made to FIGS. 2, 3 and 4, and taking the above-stated STM-1 frame condition (i.e. N=1) as an example.

Figure 2:
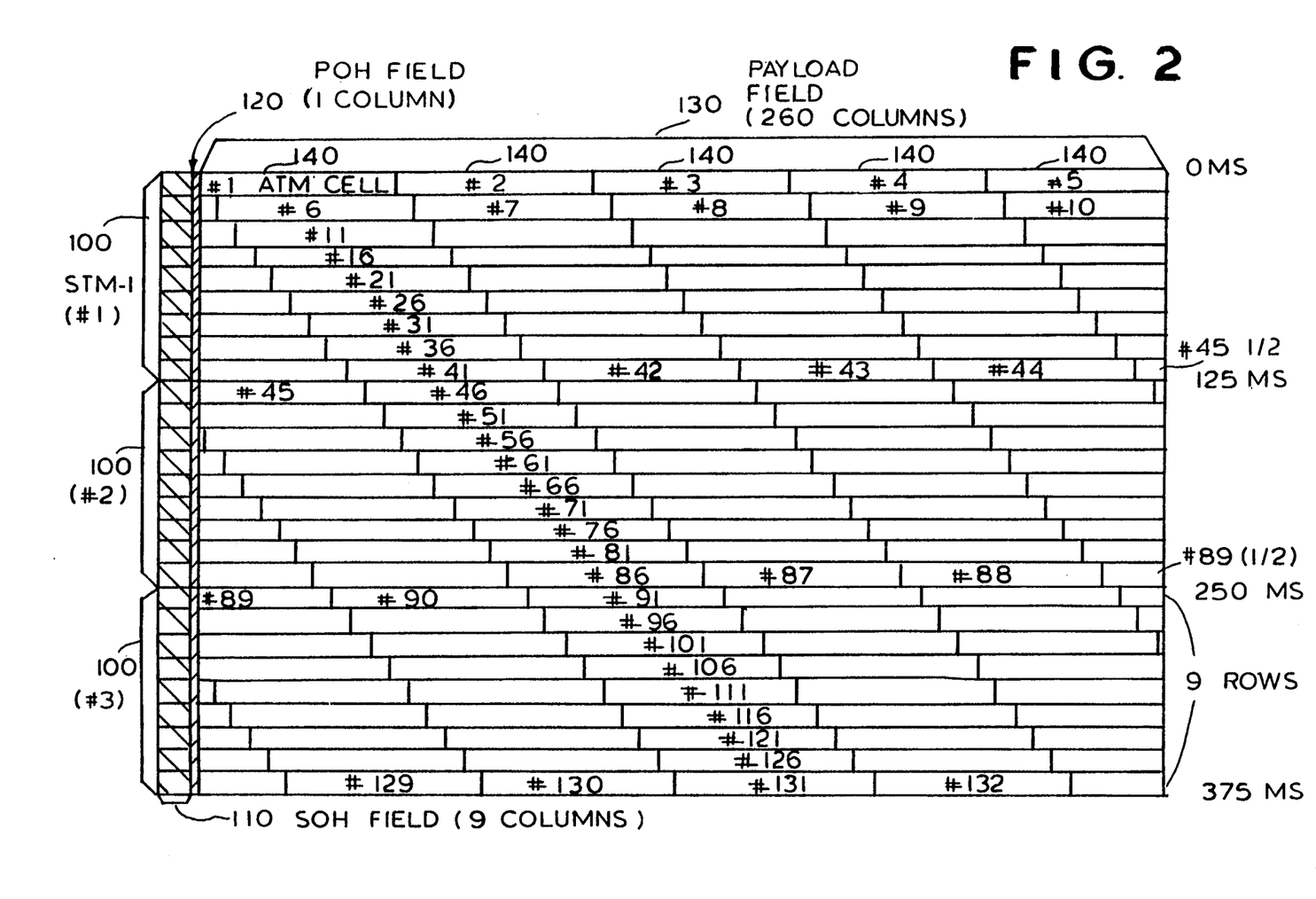
FIG. 2 shows the structure of STM-1 frames including virtual containers VC-4-1C (see CCITT Report "COM XVIII-R 33-E", FIG. 3.1/G.708 and FIG. 5.20/G.709)

As shown in FIG. 2, an STM-1 frame 100 has a capacity of 270×9 octets and repeats at a period of 125 μs. The STM-1 frame 100 is divided into three fields on the basis of the column position, as stated in previously mentioned CCITT's Report "COM XVIII-R 33-E", FIG. 3.1/G. 708 and FIG. 5.20/G. 709. Specifically, the first to ninth columns are assigned to an SOH field 110 for accommodating SOH (Section Overhead) information and AU-PTR (Administrative Unit Pointer) information. The tenth column is assigned to a POH field 120 for accommodating POH (Path Overhead) information of virtual containers VC-4-IC. Further, the eleventh to 270th columns are assigned to a payload field 130 for accommodating payload information of virtual containers VC-4-IC. ATM cells 140 are mapped in the payload field 130.

While each of the ATM cells 140 is 53 octets long, the payload field 130 has a capacity of 260×9=2340 octets, which is not an integral multiple of 53 (2340÷53=44.150 . . . ). As a result, part of the last ATM cell 140 (#45 in FIG. 2) existing in the payload field 130 of one STM-1 frame 100 (#1 in FIG. 2) is mapped in the next STM-N frame. More specifically, since five ATM cells constitutes 265 octets the boundary of nearby ATM cell 140 constituting the ATM cell stream is delayed by five octets every row of the frame 100, only part of the ATM cell 140 is mapped in this frame 100 at the end of the frame 100 (lower right portion in FIG. 2) with the other part mapped at the biginning of the next frame. Since the last ATM cell 140 extends over two STM-N frames 100, as stated above, it is extremely difficult to effect switching or a similar operation on an ATM cell 140 basis, in synchronism with the STM-1 frames 100. ATM cell format conversion which eliminates such a difficulty will be described with reference to FIG. 3.

Figure 3:
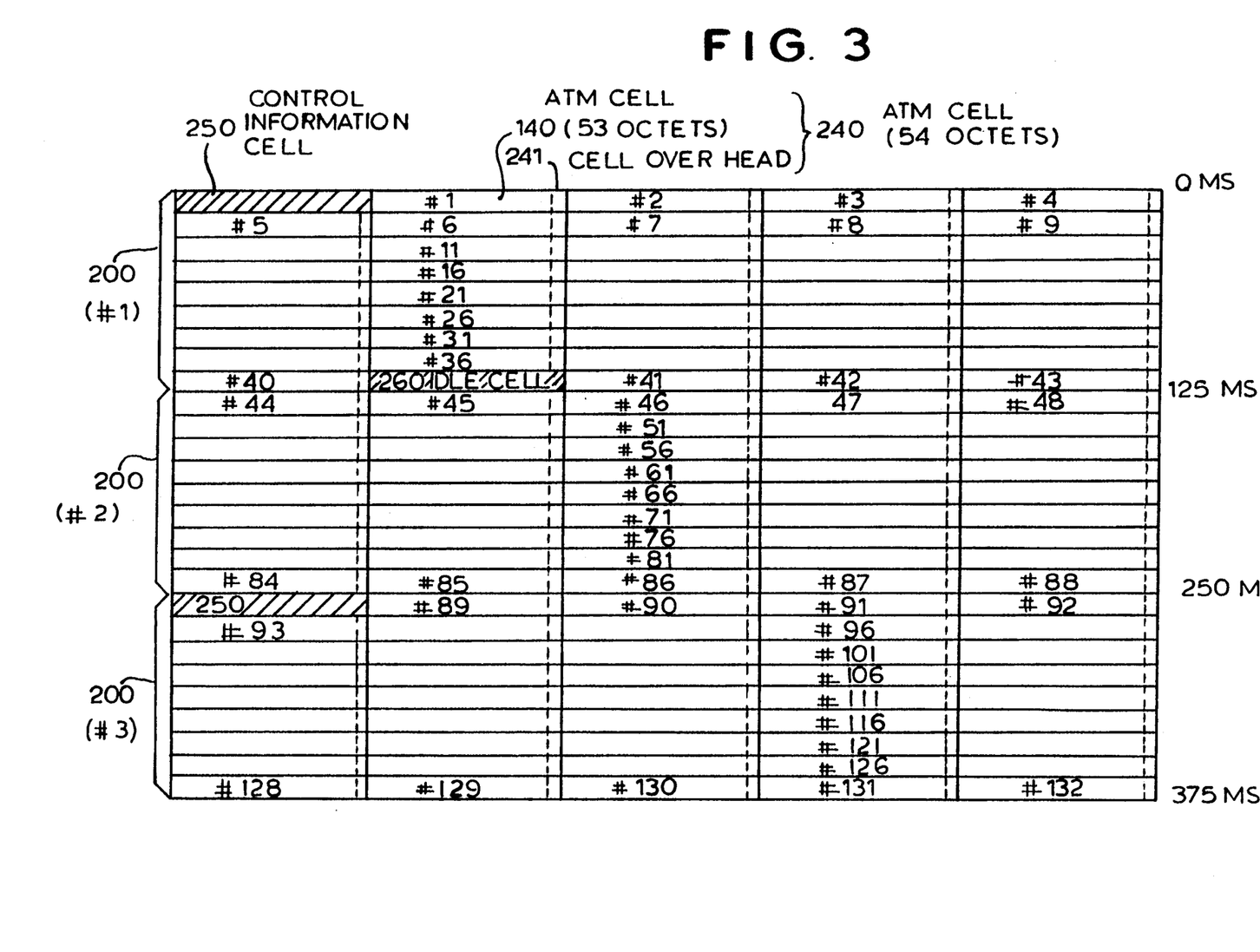
FIG. 3 is a view similar to FIG. 2, showing a frame structure which the embodiment produces by converting the STM-1 frames shown in FIG. 2.

In FIG. 3, converted frames 200, like the STM-1 frames 100, each have a capacity of 270×9 octets and repeat at a period of 125 μs. The converted frames 200 are each made up of 270 columns which are divided into five column groups every 54 octets. ATM cells 240, a control information cell 250 and an idle cell 260 are mapped in five column groups each comprising nine rows, i.e., in a 5×9 matrix. Each ATM cell 240 has a cell overhead 241 added to the end of an ATM cell 140 having been not converted.

Figure 4:
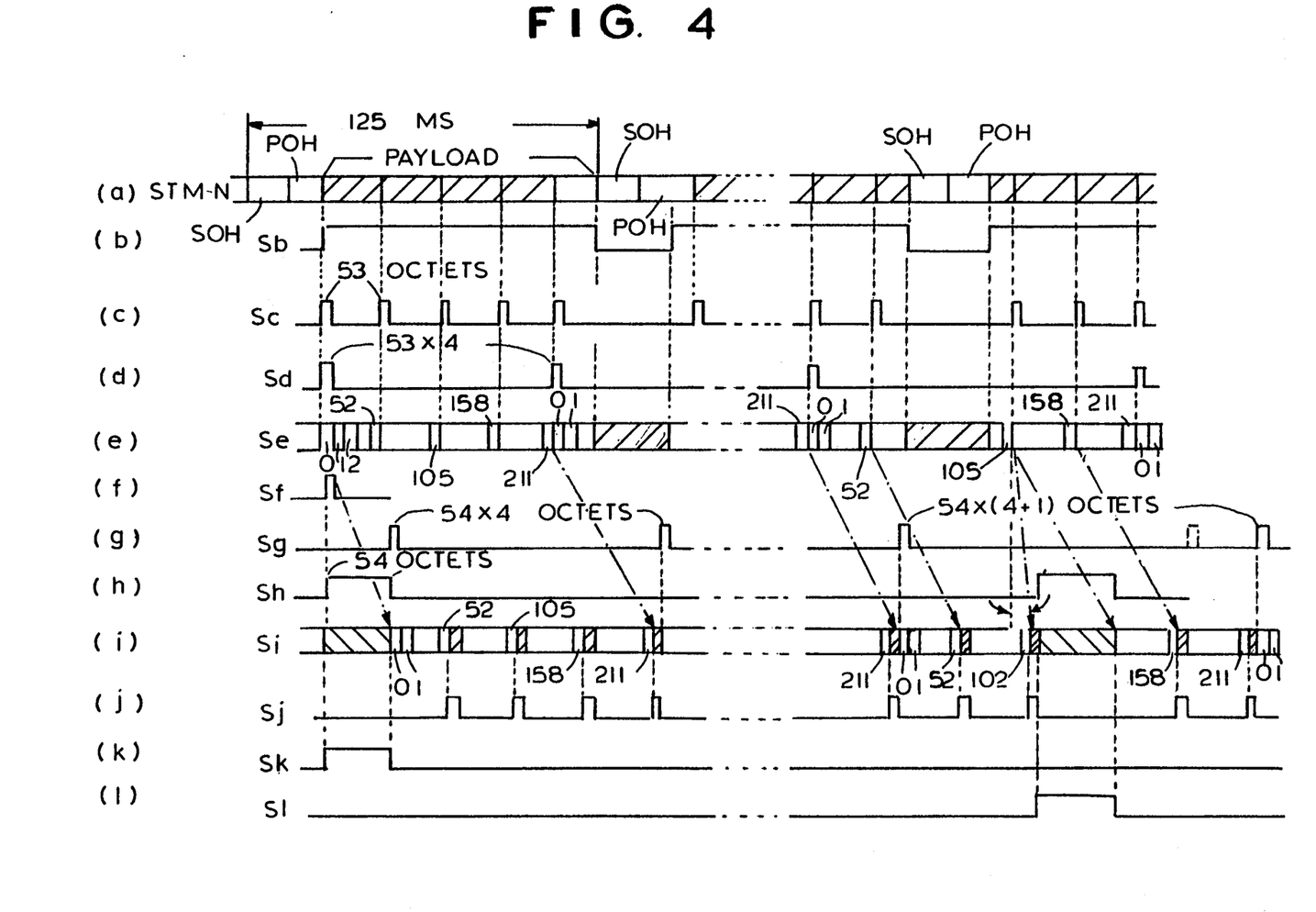
FIG. 4 is a timing chart representative of the operations of various sections included in the embodiment.

Referring also to FIG. 4, a digital signal multiplexed in the form of an STM-1 frame is applied to the SDM terminating circuit 10 of the ATM cell format conversion system 1. The SDH terminating circuit 10 sets up frame synchronization of the digital signal of the STM-1 frame (see FIG. 4(a)), generates a payload field indication signal Sb (see FIG. 4(b)) indicative of a payload field 130 as distinguished from an SOH field 110 and a POH field 120, and sends the signal Sb to the ATM cell rearranging unit 20 together with the STM-1 frame digital signal. In the ATM cell rearranging unit 20, the ATM cell synchronous circuit 21 detects, while it receives the payload field indication signal Sb, the boundaries of a plurality of ATM cells continuously contained in the payload field 130 of the STM-1 frame 100 on the basis of the synchronous patterns of the individual cells. On detecting the boundary of each ATM cell, the ATM cell synchronous circuit 21 generates an ATM cell boundary signal Sc (see FIG. 4(c)) and sends it to the write cell counter 22.

The memory 24 has a capability great enough to store a greater number of ATM cells 140 than the sum of: the number of octets which causes the write-in of the ATM cells 140 to be interrupted by the SOH field 110 and POH field (10 octets if $N=1$), and the number of octets which causes the read-out of the ATM cells 140 to be interrupted due to the insertion of a control information cell 250 and idle cell 260 (54 octets each). In the illustrative embodiment, the number n of ATM cells 140 to be accommodated in the memory 24 is four.

The write cell counter 22 sends a write reset signal Sd (see FIG. 4(d)) to the write address counter 23 every time it counts four ATM cell boundary signals Sc. In response to the write reset signal Sd, the write address counter 23 is reset to "0". Only when the payload field indication signal Sb is in an enabled state, the write address counter 23 counts up to "211 ($=53\times4-1$)" in synchronism with the octets of the ATM cells 140 and feeds write address signals Se (see FIG. 4(e)) to the memory 24. In response to each write address signal Se, the memory 24 stores only the information of four ATM cells of the STM-1 frame 100.

On the other hand, the read cell counter 26 generates, in response to the base frame pulses Sf (see FIG. 4(f)), a read reset signal Sg (see FIG. 4(g)) every time a period of time corresponding to four 54 octets long ATM cells 240 expires and sends it to the read address counter 25. Further, the read cell counter 26 sends a cyclic cell insertion signal Sk (see FIG. 4(k)) every second base frame pulse and, at the same time, outputs a count disable signal Sh (see FIG. 4(h)) to the read address counter 25. The read address counter 25 is reset to "0" by the read reset signal Sg and counts up to "211" by repeating four consecutive times the operation of counting, only when the count disable signal is in a disable state. The counter 25 counts 53 octets in synchronism with the octets of the ATM cell 240 and then stops for a period of one octet. The resultant outputs of the read address counter 25 are applied to the memory 24 as read address signals Si (see FIG. 4(i)). While the read address counter 25 stops the counting operation for a period of one octet as stated above, it outputs an overhead addition signal (see FIG. 4(j)).

On receiving the overhead addition signal Sj, the phase comparator 51 of the idle cell inserter 50 compares the address value of the write address signal Se and that of the read address signal Si. If the difference between the signals Se and Si is smaller than "10" corresponding to the number of octets of the SOH field 110 and POH field 120 of the STM-1 frame 100, the phase comparator 51 sends an idle cell insertion signal Sl (see FIG. 4(l)) to the selector 53 and read cell counter 26. In response to the idle cell insertion signal Sl, the read cell counter 26 delivers a count disable signal Sh to the read address counter 25 as it does in response to the cyclic cell insertion signal Sk. At this instant, the read cell counter 26 delays the timing for generating the next read reset signal Sg by one cell when it outputs the count disable signal Sh.

Usually, i.e., except for the time when the count disable signal Sh and overhead addition signal Sj appear, the ATM cells 140 are read out of the memory 24 in response to the read address signals Si and applied to the selector 27. In such a condition, the selector 27 selects the output of the memory 24, i.e., the ATM cells 140. However, on receiving the overhead addition signal Sj, the selector 27 selects the output of the cell overhead generator 30, i.e., the cell overhead information. As a result, the 53 octets long ATM cell 140 is converted to a 54 octets long ATM cell 240 having 1 octet long cell overhead 241 at the trailing end thereof. The 54 octets ATM cell 240 is fed to the control information cell inserter 40.

In the control information cell inserter 40, the selector 42 usually selects the selector 27 side and delivers ATM cells to the idle cell inserter 50. However, on receiving the cyclic cell insertion signal Sk, the selector 42 selects the control information cell generator 41 side and thereby outputs a control information cell 250 which is 54 octets long. As stated above, while a control information cell 250 is fed out, no information is read out of the memory 24 with the result that the output of the ATM cell 240 is delayed by one cell.

In the idle cell inserter 50, the selector 53 usually selects the selector 42 side to deliver the ATM cell 240 and control information cell 240 to the ATM switch 2. However, on receiving the idle cell insertion signal Sl, the selector 53 selects the idle cell generator 52 side and thereby outputs a 54 octets long idle cell 260. Again, while the idle cell 260 is fed out, no information is read out of the memory 24. As a result, the output of the ATM cell 240 is delayed by one cell.

As stated above, the ATM cell format conversion system 1 converts the ATM cell stream having the structure of the STM-1 frame 100 shown in FIG. 2 to the ATM cell stream having the structure of the frame 200 shown in FIG. 3. In the STM-1 frame 100 of FIG. 2, the first to 132 nd ATM cells 140 are mapped over the entire rows of the payload fields 130 of the first to third STM-1 frames 100 while being sequentially shifted by five octets. By contrast, in each row of the first to third converted frames 200 of FIG. 3, five ATM cells 240 including a control information cell 250 and an idle cell 260 are mapped. In the first converted frame 200, a control information cell 250 is inserted, and then the first to 40th ATM cells 240 are sequentially sent out. Since the 41st ATM cell 240 is different in phase from the 41st ATM cell 140 by less than 10 octets, an idle cell 260 is inserted in place of the ATM cell 240. In the third converted frame 200, since the control information cell 250 is again inserted at the beginning of such a frame 200 (i.e., every 2 frames in this example), the phase difference between the ATM cell 240 and the corresponding ATM cell 140 does not become smaller than 10 octets by the end of the frame 200 and, therefore, no idle cells 260 are inserted.

The frequency of insertion of the idle cell 260 can be determined by the following procedure. Approximately 44.15 (nearly equal to $260\times9/53$) ATM cells 140 each being 53 octets long can be accommodated in one STM-1 frame 100. On the other hand, assuming that the control information cell 250 is inserted once per two frames, approximately 44.5 $((270\times9-(54/2))/54)$ ATM cells 240 each being 54 octets long can be accommodated in one converted frame 200. Therefore, the excessively small phase difference mentioned above occurs once per substantially 2.86 (nearly equal to 1/(44.5—44.15)) frames 200, needing the insertion of an idle cell 260. It is to be noted that when the control information cell 250 is not inserted, the number of idle cells 260 to be inserted is increased.

Figure 5:
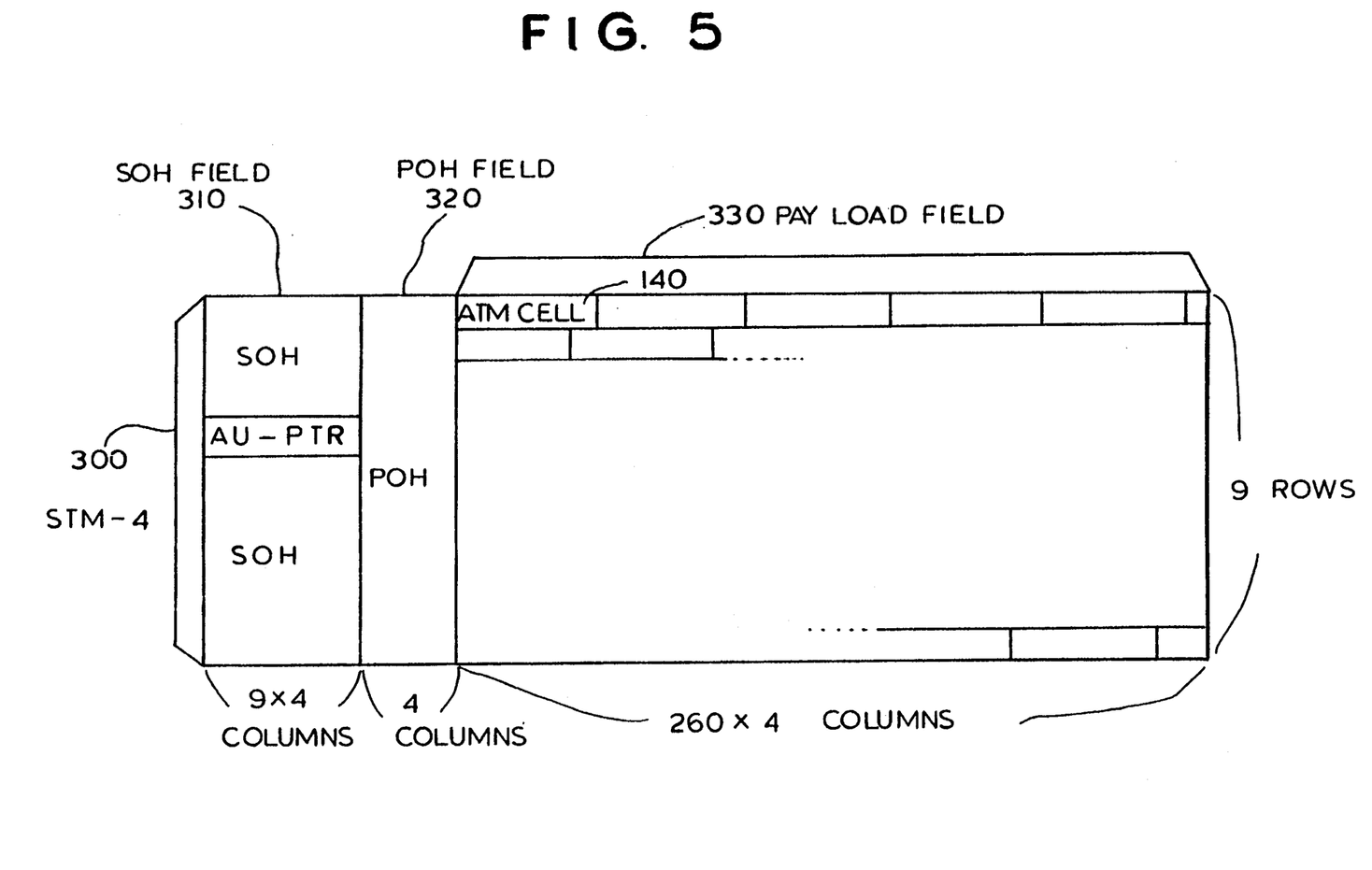
FIG. 5 shows the structure of an STM-4 frame including virtual containers VC-4-4C (see "COM XVIII-R 33-E").

FIG. 5 indicates a case wherein the input digital signal has been multiplexed in the format of an STM-4 frame (i.e. N=4). As shown, an STM-4 frame 300 has a capacity of 1080×9 octets and repeats at the period of 125 μs. In the frame 300, the first to 36th columns are assigned to an SOH field 310 for accommodating SOH and AU-PTR information, the 37th to 40th columns are assigned to a POH field 320 for accommodating POH information of virtual containers VC-4-4C, and the 41st to 1080th columns are assigned to a payload field 330 for accommodating payload information of the virtual containers VC-4-4C. The payload field 330 has a capacity of 1040 (=260×4) octets, and 53 octets long ATM cells 140 are mapped in the payload field 330.

When the ATM cell stream accommodated in the STM-4 frame 300 is subjected to ATM cell format conversion in the same manner as the previously stated STM-1 frame, ATM cells, control information cells and idle cells each being 54 octets long will be mapped over the entire range of the frame 300 in a 20 column groups×9 rows matrix.

In summary, in accordance with the present invention, ATM cells constituting a digital signal multiplexed in an STM-N frame form and each being 53 octets long are converted to 54 octets long ATM cells and rearranged over the entire range of an STM-N frame. This prevents one ATM cell from being mapped over a plurality of consecutive STM-N frames and thereby allows ATM cells to be subjected to switching or similar processing one by one in synchronism with STM-N frames. Hence, control over ATM cell processing can be effected with ease by an ATM switch or similar apparatus on the basis of an 8 kHz base clock, whereby a sufficient processing speed is maintained and reliability is enhanced. Specifically, no ATM cell is divided, i.e., a 5 octets header and a 48 octets information field thereof are processed at the same time without fail. In addition, since 1 octet cell overhead is added to each ATM cell, each cell can have control and monitor information between apparatuses as cell overhead information, enhancing the reliability of the entire system.

Moreover, the control information cell inserted every predetermined number of STM-N frames implements the transmission of control and monitor information on a channel basis. By using the control information cell, it is possible to send control information meant for any particular location of any particular channel included in an ATM transmission system and to monitor the operation of the location of interest in response to information returned from the latter.

While the output of the ATM cell format conversion system is sent to an ATM switch in the illustrative embodiment, it will be needless to mention that the ATM switch can be replaced with an ATM multiplexing apparatus or similar apparatus which processes ATM on a cell basis.

Although the invention has been described with reference to a specific embodiment, this description is not to be construed in a limiting sense. Various modifications of the disclosed embodiment, as well as other embodiments of the invention, will become apparent to persons skilled in the art on reference to the description of the invention. It is therefore contemplated that the appended claims will cover any modifications or embodiments as fall within the true scope of the invention.

What is claimed is:

1. A method of converting an ATM (Asynchronous Transfer Mode) cell format, comprising the steps of:
   receiving a digital signal multiplexed in the form of STM (Synchronous Transfer Mode)—N frames prescribed by CCITT Recommendation G.708 and having a predetermined repetition rate, said frames being made up of a plurality of ATM cell streams each having a plurality of 53-octet-long ATM cells mapped in the payload fields of virtual containers VC-4-NC, and SDH (Synchronous Digital Hierarchy) overhead information consisting of path overhead (POH) information of said virtual containers VC-4-NC, and section overhead (SOH) information of said STM-N frames;
   removing said SDH overhead information from said digital signal so as to extract said plurality of ATM cells;
   adding 1-octet-long cell overhead information to each of said extracted ATM cells to convert said ATM cells to 1 octet added ATM cells each being 54 octets long;
   generating an idle cell which is 54 octets long;
   adding said idle cell to said 1-octet-added ATM cells; and
   mapping said 1-octet added ATM cells and said idle cell so as to maintain both a synchronous relation between said STM-N frames and said 1-octet-added ATM cells accommodated in said STM-N frames, and said predetermined repetition period of said STM-N frames;
   further comprising the step of adding a 54-octet-long control information cell to said 1-octet-added ATM cells with a frequency corresponding to a predetermined number of said STM-N frames.

2. An apparatus for converting an ATM cell format, comprising:
   SDH terminating means for receiving as an input signal an ATM cell stream having a plurality of 53-octet-long ATM cells mapped in the payload fields of virtual containers VC-4-NC which have been multiplexed in the form of STM-N frames having a predetermined repetition rate, and for generating a payload field indication signal representative of the receipt of a payload field by detecting the position of SDH overhead information associated with each of said STM-N frames;
   ATM cell rearranging means for removing, in response to said payload field indication signal, said SDH overhead information from said STM-N frames so as to extract said ATM cells, for adding cell overhead information to each of said ATM cells to convert said ATM cells to 1-octet-added ATM cells each being 54 octets long, and for rearranging said 1-octet-added ATM cells, so as to maintain both a synchronous relation between said STM-N frames and said 1-octet-added ATM cells accommodated in said STM-N frames, and said predetermined repetition period of said STM-N frames;
   idle cell inserting means for generating, when the ATM cells at the input side and the output side of said ATM cell rearranging means have a phase difference which is smaller than a predetermined value, an idle cell having a length equal to that of said 1-octet-added ATM cells, and inserting said idle cell in the output of said ATM cell rearranging means;

further comprising control information cell inserting means for generating a control information cell having a length equal to that of said 1-octet-addet ATM cells with a frequency corresponding to a predetermined number of said STM-N frames, and adding said control information cell to said 1-octet-added ATM cells.

3. An apparatus for converting an ATM cell format, comprising:

SDH terminating means for receiving as an input signal an ATM cell stream having a plurality of 53-octet-long ATM cells mapped in the payload fields of virtual containers VC-4-NC which have been multiplexed in the form of STM-N frames having a predetermined repetition rate, and for generating a payload field indication signal representative of the receipt of a payload field by detecting the position of SDH overhead information associated with each of said STM-N frames;

ATM cell rearranging means for removing, in response to said payload field indication signal, said SDH overhead information from said STM-N frames so as to extract said ATM cells, for adding cell overhead information to each of said ATM cells to convert said ATM cells to 1-octet-added ATM cells each being 54 octets long, and for rearranging said 1-octet-added ATM cells, so as to maintain both a synchronous relation between said STM-N frames and said 1-octet-added ATM cells accommodated in said STM-N frames, and said predetermined repetition period of said STM-N frames;

idle cell inserting means for generating, when the ATM cells at the input side and the output side of said ATM cell rearranging means have a phase difference which is smaller than a predetermined value, an idle cell having a length equal to that of said 1-octet-added ATM cells, and inserting said idle cell in the output of said ATM cell rearranging means;

wherein said ATM cell rearranging means comprises:

an ATM cell synchronous circuit for generating an ATM cell boundary signal in response to a payload field indication signal;

a write cell counter for generating a write reset signal every time said write cell counter counts a predetermined number of said ATM cell boundary signals;

a write address counter initialized by said write reset signal for sequentially generating write address signals by using said payload field indication signal as a count enable signal;

a memory using said payload field indication signal as a write enable signal for sequentially storing, in response to said write address signals, said 53-octet-long ATM cells accommodated in said payload field, and sequentially reading out said stored ATM cells in response to read address signals;

a read counter for generating a read reset signal every predetermined period of time corresponding to said predetermined number of 1-octet-added ATM cells on the basis of base frame pulses equal in period to said STM-N frames, and generating, when a cell of another kind is inserted in the output of said memory a count disable signal equal in length to said 1-octet-added ATM cells while delaying the next read reset signal by a period of time equal to the length of said count disable signal;

a read address counter initialized by said read reset signal for sequentially generating said read address signals by repeating said predetermined number of times an operation of stopping counting by one octet every time said read address counter counts 53 octest and generating said cell overhead addition signal in response to said count disable signal; and a selector responsive to said cell overhead addition signal for adding said cell overhead information to each of said 53-octet-long ATM cells appearing on the output of said memory to thereby send out said 1-octet-added ATM cells.

4. An apparatus as claimed in claim 2, wherein said ATM cell rearranging means comprises:

an ATM cell synchronous circuit for generating an ATM cell boundary signal in response to a payload field indication signal;

a write cell counter for generating a write reset signal every time said write cell counter counts a predetermined number of said ATM cell boundary signals;

a write address counter initialized by said write reset signal for sequentially generating write address signals by using said payload field indication signal as a count enable signal;

a memory using said payload field indication signal as a write enable signal for sequentially storing, in response to said write address signals, said 53-octet-long ATM cells accommodated in said payload field, and sequentially reading out said stored ATM cells in response to read address signals;

a read counter for generating a read reset signal every predetermined period of time corresponding to said predetermined number of 1-octet-added ATM cells on the basis of base frame pulses equal in period to said STM-N frames, and generating, when a cell of another kink is inserted in the output of said memory, a count disable signal equal in length to said 1-octet-added ATM cells while delaying the next read reset signal by a period of time equal to the length of said count disable signal;

a read address counter initialized by said read reset signal for sequentially generating said read address signals by repeating said predetermined number of times an operation of stopping counting by one octet every time said read address counter counts 53 octets and generating said cell overhead addition signal in response to said count disable signal; and a selector responsive to said cell overhead addition signal for adding said cell overhead information to each of said 53-octet-long ATM cells appearing on the output of said memory to thereby send out said 1-octet-added ATM cells.

5. An apparatus as claimed in claim 2, wherein said control information cell inserting means adds said control information cell to the output of said ATM cell rearranging means.

6. An apparatus as claimed in claim 5, wherein said control information cell inserting means is interposed between said ATM cell rearranging means and said idle cell inserting means.

* * * * *